United States Patent
Tabuchi

(10) Patent No.: US 11,428,581 B2
(45) Date of Patent: Aug. 30, 2022

(54) METHODS AND APPARATUS FOR PREDICTIVE MODELING IN AN IMAGING SYSTEM

(71) Applicant: SEMICONDUCTOR COMPONENTS INDUSTRIES, LLC, Phoenix, AZ (US)

(72) Inventor: Yoshihisa Tabuchi, Gifu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 836 days.

(21) Appl. No.: 15/962,712

(22) Filed: Apr. 25, 2018

(65) Prior Publication Data

US 2019/0331534 A1 Oct. 31, 2019

(51) Int. Cl.
*G01K 1/20* (2006.01)
*H04N 5/225* (2006.01)
*G01K 13/00* (2021.01)

(52) U.S. Cl.
CPC ........... *G01K 1/20* (2013.01); *G01K 13/00* (2013.01); *H04N 5/2257* (2013.01)

(58) Field of Classification Search
CPC ......... G01K 1/20; G01K 13/00; H04N 5/2257
See application file for complete search history.

(56) References Cited

U.S. PATENT DOCUMENTS

| | | | |
|---|---|---|---|
| 6,826,361 B1 * | 11/2004 | Yost | G03B 13/36 396/97 |
| 2012/0114322 A1 | 5/2012 | Saito | |
| 2015/0022130 A1 | 1/2015 | Canon | |
| 2016/0239057 A1 * | 8/2016 | Kocagoez | G06F 1/203 |
| 2016/0357898 A1 * | 12/2016 | Johnson | G06F 30/398 |
| 2016/0378897 A1 * | 12/2016 | Anderson | G06F 30/367 716/110 |
| 2019/0135150 A1 * | 5/2019 | Gao | B60N 2/643 |
| 2019/0190296 A1 * | 6/2019 | Paralikar | H02J 7/0088 |

OTHER PUBLICATIONS

E. Coates, "Resistors & Circuits" 2015, Learn about Electronics. org, Module 3, pp. 1-8. (Year: 2015).*

* cited by examiner

*Primary Examiner* — Mohamed Charioui
*Assistant Examiner* — Christine Y Liao
(74) *Attorney, Agent, or Firm* — Dickinson Wright PLLC

(57) ABSTRACT

Various embodiments of the present technology may comprise methods and apparatus for predictive modeling in an imaging system. The methods and apparatus for predictive modeling may comprise various circuits and/or systems configured to measure a temperature and utilize the measured temperature in conjunction with a predictive model to predict a self-heating value, temperature changes, and an ambient temperature.

20 Claims, 10 Drawing Sheets

METHODS AND APPARATUS FOR PREDICTIVE MODELING IN AN IMAGING SYSTEM

BACKGROUND OF THE TECHNOLOGY

Electronic devices, such as cellular telephones, cameras, and computers, commonly use a lens module, comprising a lens and a lens barrel, in conjunction with an image sensor to capture images. Many imaging systems employ a control circuit to perform various signal processing techniques to improve image quality by adjusting the position of the lens relative to the image sensor.

Imaging systems generally employ an actuator to move the lens module to an optimal position to increase the image quality. In operation, changes to the ambient temperature of the image sensor, the actuator, and/or the control circuit may adversely affect the operation of those components and/or result in an out-of-focus image. Accordingly, it may be desired to monitor and detect the ambient temperature of relevant components. A temperature sensor is generally employed to detect and monitor the ambient temperature of the relevant components. However, in some cases, one or more components may generate heat ("self-generated heat") and the temperature detected by the temperature sensor may contain both the ambient temperature and the self-generated heat. As such, the detected temperature may contain an error amount – the difference between the measured temperature and the actual ambient temperature.

SUMMARY OF THE INVENTION

Various embodiments of the present technology may comprise methods and apparatus for predictive modeling in an imaging system. The methods and apparatus for predictive modeling may comprise various circuits and/or systems configured to measure a temperature and utilize the measured temperature in conjunction with a predictive model to predict a self-heating value, temperature changes, and an ambient temperature.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of actuators, image sensors, position sensors, temperature sensors, and the like, which may carry out a variety of functions. In addition, the present technology may be practiced in conjunction with any number of applications, and the apparatus described is merely one exemplary application for the technology. Further, the present technology may employ any number of conventional techniques for performing various computations, processing image data, and the like.

Figure 1:
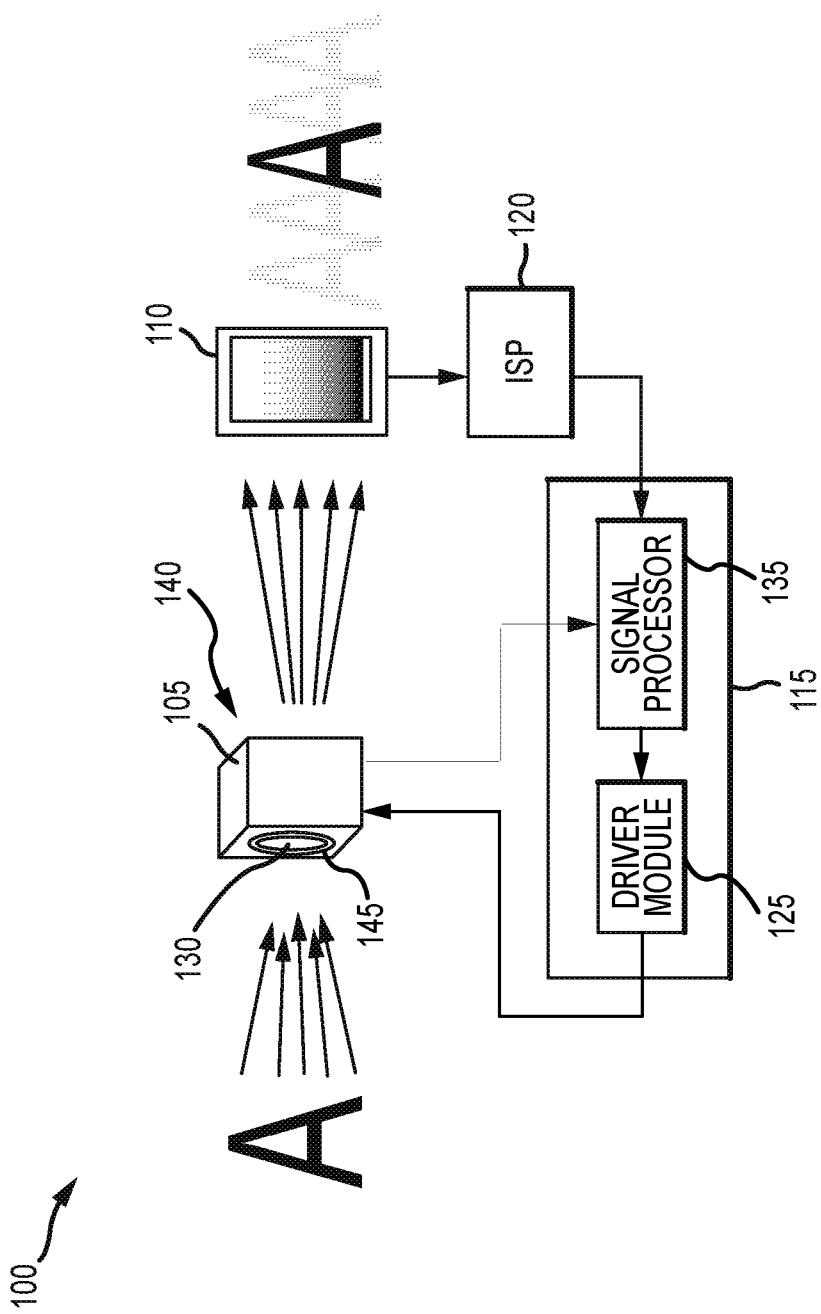
FIG. 1 is a block diagram of an imaging system in accordance with an exemplary embodiment of the present technology.

The present technology may be used in conjunction with any suitable electronic device or system, such as a digital camera, smartphone, laptop, portable device, and the like. Referring now to FIG. 1, an exemplary embodiment of the present technology is implemented in an imaging system 100. The imaging system 110 may comprise autofocus functions. According to an exemplary embodiment, and to improve the overall operation of the imaging system 100, the imaging system 100 may utilize a measured temperature and a predictive temperature model to establish or otherwise estimate an ambient air temperature value.

The imaging system 100 may comprise any suitable device and/or system configured to focus an image on a sensing surface and capture image data. For example, in an exemplary embodiment, the imaging system 100 may comprise an image sensor 110, a control circuit 115, a lens assembly 140, and an image signal processor (ISP) 120.

Figure 5:
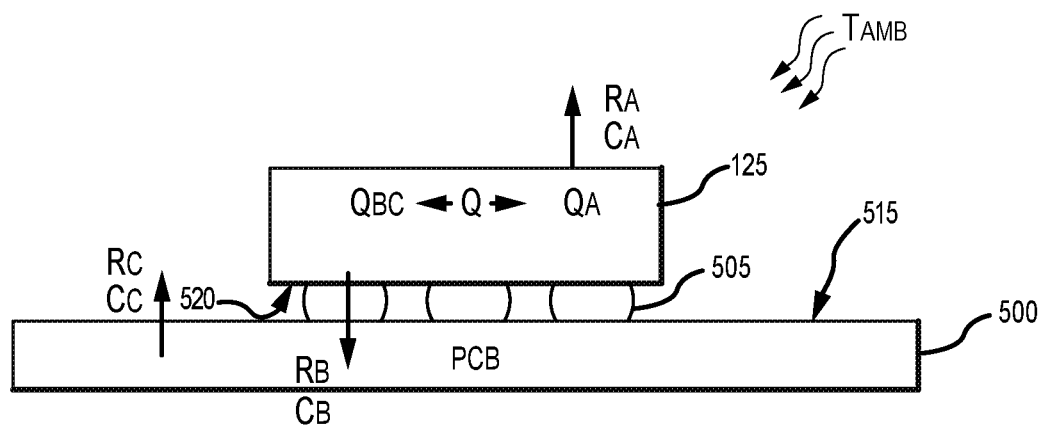
FIG. 5 representatively illustrates a thermal response between the driver module, a PCB, and surrounding air in accordance with an exemplary embodiment of the present technology.
Figure 6:
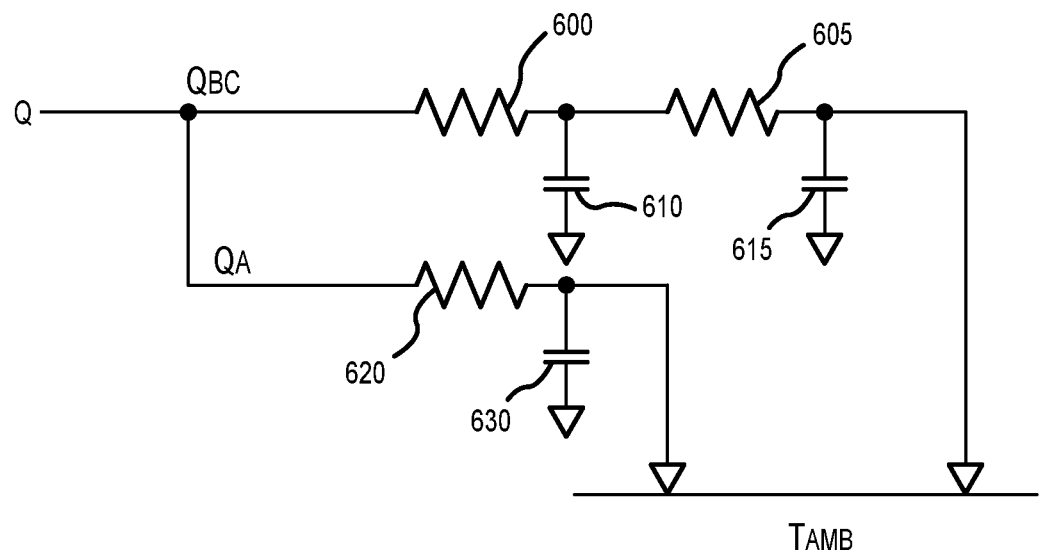
FIG. 6 is a circuit diagram of the thermal response between the driver module, the PCB, and surrounding air in accordance with an exemplary embodiment the present technology.

The image sensor 110 may be suitably configured to capture image data. For example, the image sensor 110 may comprise a sensing surface, such as a pixel array (not shown), to detect light and convey information that constitutes an image by converting the variable attenuation of light waves (as they pass through or reflect off the object) into electrical signals. The pixel array may comprise a plurality of pixels arranged in rows and columns, and the pixel array may contain any number of rows and columns, for example, hundreds or thousands of rows and columns. Each pixel may comprise any suitable photosensor, such as a photogate, a photodiode, and the like, to detect light and convert the detected light into a charge. The image sensor 110 may be implemented in conjunction with any appropriate technology, such as active pixel sensors in complementary metaloxide-semiconductors (CMOS) and charge-coupled devices. In various embodiments, the image sensor 110 may be mounted on a printed circuit board (PCB) 500 (FIG. 5).

The lens assembly 140 may be configured to focus light on the sensing surface of the image sensor 110. For example, according to various embodiments, the lens assembly 140 is positioned adjacent to the image sensor 110. The lens assembly 140 may comprise a lens 130 to focus an image on the sensing surface of the image sensor 110 and a lens barrel 145 to hold the lens 130. The lens barrel 145 and the lens 130 are typically in a fixed position relative to each other and may be referred to collectively as a mobile lens part. The lens assembly 140 may further comprise an actuator (not shown) to reposition the mobile lens part in response to a manual operation by a user of the imaging system 100 and/or to reposition the mobile lens part during an autofocus operation. The lens assembly 140 may be connected to and responsive to a control signal from the control circuit 115. For example, the actuator may respond to the control circuit 115 to move the mobile lens part either closer to or further away from the image sensor 110 to focus the image on the image sensor 110. Accordingly, the lens assembly 140 and the control circuit 115 may operate in conjunction with each other to reposition the mobile lens part and/or provide an autofocus function.

The lens 130 may comprise any lens or lens system suitable for focusing light on the image sensor 110 and may be positioned adjacent to the sensing surface of the image sensor 110. The lens 130 may be adjustable relative to the image sensor 110. For example, the lens barrel 145, which holds the lens 130, may be coupled to the actuator and configured to move along a plane that is perpendicular to the sensing surface of the image sensor 110 (i.e., movement closer to or away from the surface of the image sensor, in a z-direction). The lens 130 may further be configured to move along a plane that is parallel to the sensing surface of the image sensor 110 (i.e., in an x-direction and in a y-direction). In various embodiments, the lens 130 may comprise a plurality of lens elements arranged adjacent to each other. The lens 130 may be formed using any suitable material, such as glass, quartz glass, fluorite, germanium, meteoritic glass, polycarbonate, plastic, high-index plastic, and the like, or any combination thereof.

The lens barrel 145 comprises a structure configured to secure the lens 130. For example, various mounting techniques may be employed to mount the lens 130 to the lens barrel 145, such as hard mounting, drop-in mounting, elastomeric mounting, and the like. The lens barrel 145 may further comprise various elements to maintain proper air spacing and/or alignment of the lens 130 (or lens elements), such as retainer rings, snap rings, spun rims, and the like.

The lens barrel 145 may be formed using metals, such as aluminum, stainless steel, beryllium, titanium, and metal alloys, and/or nonmetals, such as glass, carbon fiber composites, or plastic, wherein each material may be described according to a coefficient of thermal expansion. As such, the lens barrel 145 may expand and contract based the type of material used to form the lens barrel 145. For example, a lens barrel 145 comprising metal may have a larger coefficient of thermal expansion than a lens barrel 145 comprising glass. In various embodiments, the material used to form the lens barrel 145 may differ from that used to form the lens 130.

The actuator may be configured to move the mobile lens part along various axes (e.g., along an x-, y-, and/or z-axis) to improve image quality. The actuator may comprise any suitable device or system capable of moving and/or repositioning the mobile lens part in response to a signal. The actuator may be configured to move the mobile lens part for the purpose of performing autofocus functions, counteracting involuntary movements, such as hand jitter or shaking, and the like. For example, in one embodiment, the actuator may comprise a voice coil motor, comprising a driving magnet (not shown) and a sensing magnet (not shown), that is responsive to a control signal from the control circuit 115. The actuator may be limited in the amount of movement it can perform, whether self-limiting or due to the design of the system. For example, the lens assembly 140 may comprise a housing 105 with sidewalls, to house the lens 130, the lens barrel 145, and the actuator. As such, a maximum range of movement that the actuator may impart to the mobile lens part may be limited by the interior dimensions of the housing 105.

According to various embodiments, portions of the actuator, such as the sensing magnet, may be physically coupled to the lens barrel 145. In other embodiments, however, the actuator may be positioned within or adjacent to the mobile lens part. The particular arrangement may be based on the type of actuator used, the size and shape of the lens 130 and/or lens barrel 145, design choices, and the like.

In various embodiments, the imaging system 100 may be further configured to measure a position of the lens barrel 145 and/or lens 130 relative to the image sensor 110. For example, the imaging system 100 may comprise a position sensor (not shown). The position sensor detects movement and a position of the lens barrel 145 and/or lens 130. The position sensor may comprise any suitable circuit for measuring a relative position, such as a hall sensor. In such a case, the position sensor may determine the position of the lens barrel 145 and/or lens 130 by varying an output voltage in response to a magnetic field. The output voltage may correspond to a magnitude and direction of the mobile lens part relative to a reference point. According to various embodiments, the position sensor may be formed on the same chip as the control circuit 115, on a companion chip, within the lens module 140, or any other suitable location.

In various embodiments, the ISP 120 may perform various digital signal processing functions, such as color interpolation, color correction, facilitate autofocus, exposure adjustment, noise reduction, white balance adjustment, compression, and the like, to produce an output image. In an exemplary embodiment, the ISP 120 may be configured to receive and process image data from the image sensor 110 to determine a degree of focus of an image (i.e., the amount that the image is in-focus/out-of-focus). The degree of focus may be represented by a numerical value. The ISP 120 may utilize the numerical value to further determine an initial target position for the lens 130 (and lens barrel 145), wherein the initial target position represents a position of the lens 130 that is required to focus the image on the image sensor 110.

The ISP 120 may comprise any number of devices and/or systems for performing calculations, transmitting and receiving image pixel data, measuring the degree of focus, and a storage unit for storing pixel data, such as random-access memory, non-volatile memory or any other memory device suitable for the particular application. Further, the ISP 120 may utilize any suitable techniques and/or methods for determining and/or calculating the degree of focus of the image. In various embodiments, the ISP 120 may be implemented with a programmable logic device, such as a field programmable gate array (FPGA) or any other device with reconfigurable digital circuits. In other embodiments, the ISP 120 may be implemented in hardware using non-programmable devices. The ISP 120 may be formed partially or entirely within an integrated circuit using any suitable CMOS techniques or fabrication processes, in an ASIC (application-specific integrated circuit), using a processor and memory system, or using another suitable implementation.

The ISP 120 may transmit the output image to an output device, such as a display screen or a memory component, for storing and/or viewing the image data and/or the output image. The output device may receive digital image data, such as video data, image data, frame data, and/or gain information from the ISP 120. In various embodiments, the output device may comprise an external device, such as a computer display, memory card, or some other external unit.

The control circuit 115 controls and supplies power to various devices within the imaging system 100. For example, the control circuit 115 may control and supply power to the actuator to move the mobile lens part to a desired position. According to various embodiments, the control circuit 115 may supply a drive current $I_{DR}$, having a magnitude and direction, to the lens assembly 140 and/or the actuator. In general, the lens assembly 140 and/or the actuator responds to the drive current $I_{DR}$ by moving the mobile lens part an amount that is proportional to the amount of power supplied by the control circuit 115.

According to various embodiments, the control circuit 115 may operate in conjunction with other components and receive various signals, such as signals from the ISP 120 and/or the image sensor 110, to determine an appropriate amount of power to supply to the actuator and/or a desired position for the mobile lens part. For example, in an exemplary embodiment, the control circuit 115 may be coupled to and configured to receive the initial target position from the ISP 120. The control circuit 115 may further receive a feedback signal from the actuator and/or the lens module 140. The feedback signal may be related to position information of the mobile lens part, operation information of the actuator, or any other relevant feedback information.

The control circuit 115 may comprise any suitable device and/or system capable of providing energy to the actuator and/or lens module 140. For example, the control circuit 115 may comprise a driver module 125 to generate and supply the drive current $I_{DR}$ to the actuator and a signal processor 135.

The signal processor 135 may perform various processing functions, such as digital signal processing, filtering, gain control, signal conversion, and the like. The signal processor 135 may further generate signals, such as a feedback signal, a position signal, and the like. For example, the signal processor 135 may comprise any number of filters, such as a band-pass filter, a signal converter, such as an analog-to-digital converter, an amplifier, a feedback network, and the like. According to an exemplary embodiment, the signal processor 135 may be connected to the ISP 120 and configured to receive the initial position signal from the ISP 120.

Figure 2:
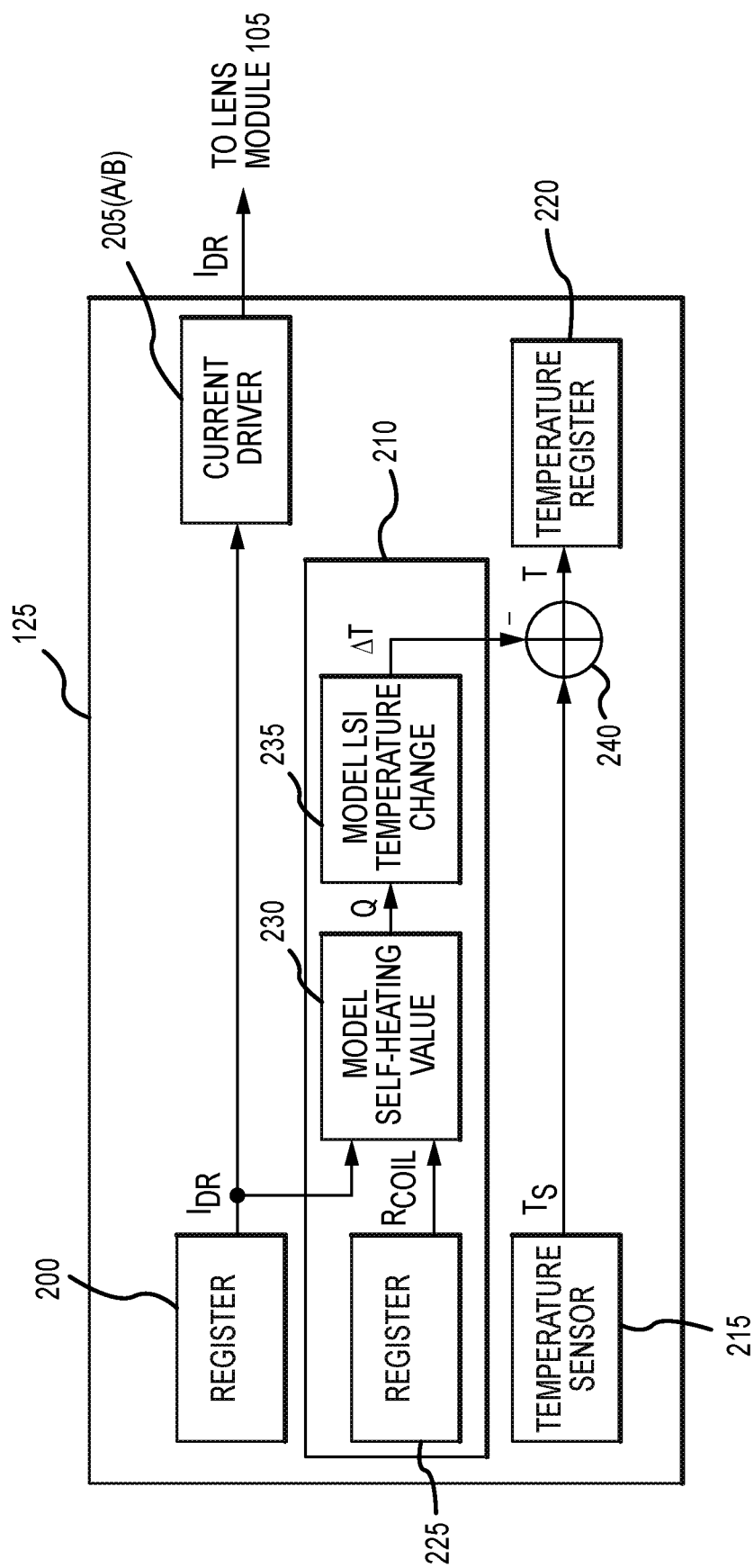
FIG. 2 is a block diagram of a driver module in accordance with an exemplary embodiment of the present technology.

Referring to FIGS. 2 and 5, the driver module 125 may be configured to drive the actuator and facilitate movement of the mobile lens part. The driver module 125 may also be configured to measure a temperature of the driver module 125 and utilize the temperature and known parameters of the driver module 125, such as a surface area of a surface 520 of the driver module 125, to predict a temperature change of the driver module 125. For example, the driver module 125 may comprise a current driver circuit 205(A/B), an adder circuit 240, a temperature sensor 215, and a computation circuit 210.

According to an exemplary embodiment, the driver module 125 may be bonded to a surface 515 of the PCB 500 using any suitable bonding method. For example, the surface 520 of the driver module 125 may be bonded to the surface of the PCB 500 using metal solder bumps 505. In an exemplary embodiment, the surface area of the PCB 500 is larger than the surface area of the driver module 125.

In operation, the driver module 125 generates a total quantity of heat Q (also referred to as self-generated heat or self-heating value). A portion of the heat $Q_A$ is dissipated into the air and a remaining portion of the heat $Q_{BC}$ is dissipated or otherwise transferred to the PCB 500. The amount of heat dissipated into the air and the PCB 500 is based on thermal resistance and thermal capacitance quantities. For example, the amount of heat that is dissipated into the air ($Q_A$) is based on a first thermal resistance $R_A$ and a first thermal capacitance $C_A$. Similarly, the amount of heat dissipated into the PCB 500 ($Q_{BC}$) is based on a second thermal resistance $R_B$ and a second thermal capacitance $C_B$. The heat in the PCB 500 then further dissipates into the air according to a third thermal resistance $R_C$ and a third thermal capacitance $C_C$.

According to an exemplary embodiment, the driver module 125 may further comprise a first register 200 (a current register 200) configured to store the drive current $I_{DR}$ value. For example, the current register 200 may communicate with the signal processor 135 and receive the drive current $I_{DR}$ value. The current register 200 may comprise any suitable memory or storage device capable of storing data.

The computation circuit 210 may be configured to utilize a predictive model in conjunction with known data relating to the imaging system 100 and measured data to predict or otherwise model a thermal response of the driver module 125 together with the PCB 500. According to various embodiments, the computation circuit 210 may comprise various logic devices suitable for performing arithmetic functions. The computation circuit 210 may further comprise various storage devices and/or memory suitable for storing known values and/or data describing a relationship between two variables, such a look-up table. Alternatively, the computation circuit 210 may be configured to receive relevant data. For example, the computation circuit 210 may be connected to the current register 200 and configured to receive the drive current $I_{DR}$ value.

In an exemplary embodiment, the computation circuit 210 may comprise a second register 225 (a resistance register 225) to store a resistance value $R_{COIL}$ of the actuator. Alternatively, the computation circuit 210 may be connected to the resistance register 225 and configured to receive the resistance value $R_{COIL}$. The resistance value $R_{COIL}$ may be a known value based on the specifications of the actuator. For example, the actuator may have a starting resistance value. Over time, however, the resistance of the actuator may change. In such a case, the resistance register 225 may update the resistance value $R_{COIL}$ periodically.

The computation circuit 210 may further comprise various logic circuits to perform various computations. For example, the computation circuit 210 may comprise a first logic circuit 230 to model or otherwise predict the total quantity of heat Q of the driver module 125. The total quantity of heat Q of the driver module 125 may be described according to the following equation:

$$Q = V_{DD} \times I_{DR} - I_{DR}^2 R_{COIL} \quad \text{(Formula 1)},$$

where $V_{DD}$ is a supply voltage, $I_{DR}$ is the current through the current driver circuit 205(A/B) (i.e., the drive current), and $R_{COIL}$ is the resistance of the actuator. The first logic circuit 230 may comprise any circuit and/or system suitable for performing the computation of Formula 1. In an exemplary embodiment, the first logic circuit 230 may be connected to the resistance register 225 and configured to receive the resistance value $R_{COIL}$.

The computation circuit 210 may further comprise a second logic circuit 235 to model or otherwise predict a first temperature change $\Delta T_A$, a second temperature change $\Delta T_B$, a third temperature change $\Delta T_C$, and a total temperature change $\Delta T$ of the driver module 125 and/or PCB 500.

The first temperature change $\Delta T_A$ may be described according to the following equation:

$$\Delta T_A = Q \times \frac{Q_A}{Q_A + Q_{BC}} \times R_A (1 - e^{-t/R_A C_A}), \quad \text{(Formula 2)}$$

where Q is the total quantity of heat as computed in Formula 1, $Q_A/Q_A+Q_{BC}$ is an estimated ratio based on simulations of a particular driver module 125 where, generally, $Q_A$ is the quantity of heat dissipated into the air, $Q_{BC}$ is the quantity of heat dissipated into the PCB 500, and t is time, $R_A$ is the first thermal resistance, and $C_A$ is the first thermal capacitance.

The second temperature change $\Delta T_B$ may be described according to the following equation:

$$\Delta T_B = Q \times \frac{Q_{BC}}{Q_A + Q_{BC}} \times R_B (1 - e^{-t/R_B C_B}), \quad \text{(Formula 3)}$$

where Q is the total quantity of heat as computed in Formula 1, $Q_{BC}/(Q_A+Q_{BC})$ is an estimated ratio based on simulations of a particular driver module 125 where, generally, $Q_A$ is the quantity of heat dissipated into the air, $Q_{BC}$ is the quantity of heat dissipated into the PCB 500, t is time, $R_B$ is the second thermal resistance, and $C_B$ is the second thermal capacitance.

The third temperature change $\Delta T_C$ may be described according to the following equation:

$$\Delta T_C = Q \times \frac{Q_{BC}}{Q_A + Q_{BC}} \times R_C (1 - e^{-t/R_C C_C}), \quad \text{(Formula 4)}$$

where Q is the total quantity of heat as computed in Formula 1, $Q_{BC}/(Q_A+Q_{BC})$ is an estimated ratio based on simulations of a particular driver module 125 where, generally, $Q_A$ is the quantity of heat dissipated into the air, $Q_{BC}$ is the quantity of heat dissipated into the PCB 500, t is time, $R_C$ is the third thermal resistance, and $C_C$ is the third thermal capacitance.

The total temperature change $\Delta T$ may be described according to the following equation: $\Delta T = \Delta T_A + \Delta T_B + \Delta T_C$ (Formula 5). Formula 5 may also be expressed as:

$$\Delta T = Q_A \times R_A (1 - e^{-t/R_A C_A}) + Q_{BC} \times [R_B (1 - e^{-t/R_B C_B}) + R_C (1 - e^{-t/R_C C_C})].$$

According to an exemplary embodiment, the computation circuit 210 may transmit the total temperature change $\Delta T$ to the adder circuit 240.

The first, second, and third thermal resistance values $R_A$, $R_B$, $R_C$ may be known values based on the particular specifications of the driver module 125 and/or the PCB 500, such as the surface area of the driver module 125 and the surface area of the PCB 500, the particular materials used to construct the driver module 125 and PCB 500, and other relevant parameters. Accordingly, the values may be measured under test conditions. Similarly, the first, second, and third thermal capacitance values $C_A$, $C_B$, $C_C$ may also be known values based on the particular specifications of the driver module 125 and the PCB 500, and may also be measured under test conditions.

The current driver circuit 205(A/B) facilitates movement of the mobile lens part to a desired position, and may comprise any suitable circuit for varying a voltage across the circuit in order to maintain a constant electrical current output in response to a control signal. For example, the current driver circuit 205(A/B) may receive and respond to various signals from the signal processor 135 by generating the drive current $I_{DR}$. The current driver circuit 205(A/B) may apply the drive current $I_{DR}$ to the actuator, wherein the drive current $I_{DR}$ may correspond to a desired position for the mobile lens part.

Alternatively or additionally, the current driver circuit 205(A/B) may facilitate movement of the mobile lens part to achieve the desired position by controlling the drive current $I_{DR}$ to the actuator, which in turn controls the magnitude and direction of movement of the mobile lens part. For example, the current driver circuit 205 may generate the current in either a first direction or an opposite second direction. The direction of the current may be based on the desired position.

Figure 3:
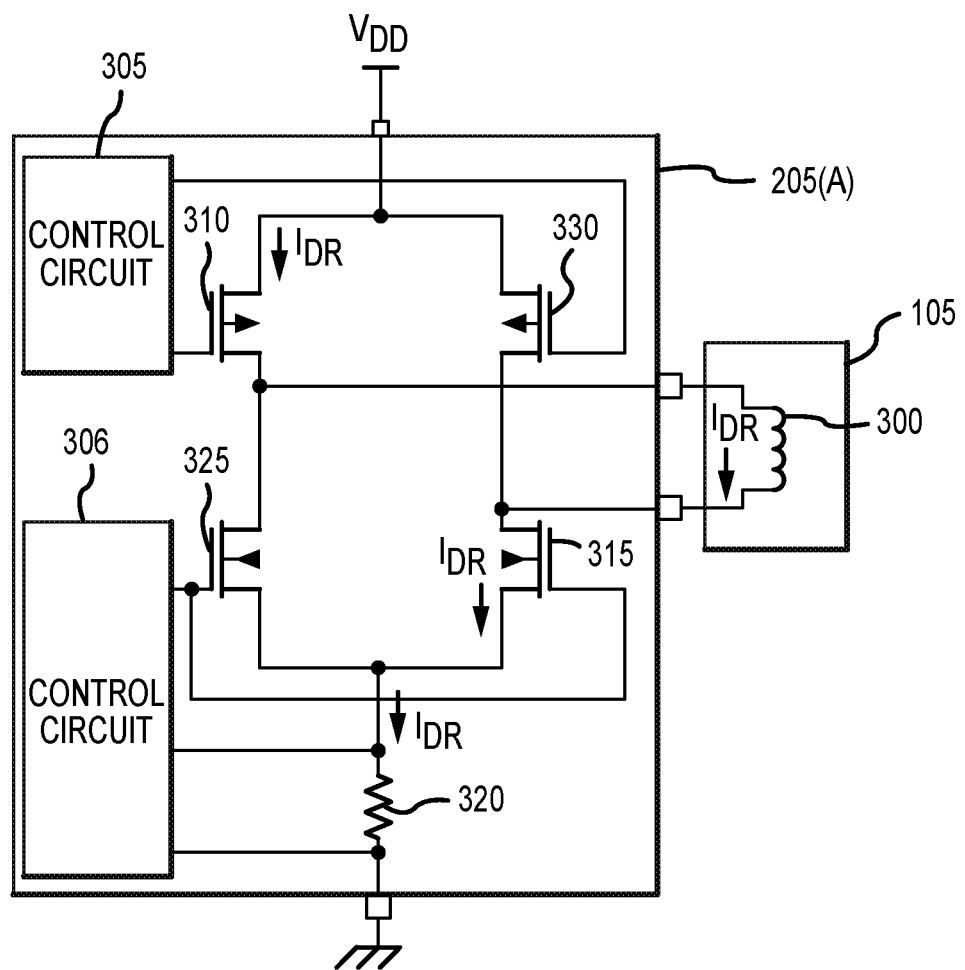
FIG. 3 is a circuit diagram of a current driver in accordance with an exemplary embodiment of the present technology.

Referring to FIG. 3, in a first embodiment, the current driver circuit 205(A) may be configured as a bidirectional type that is capable of applying the drive current $I_{DR}$ in a first direction or an opposite second direction. In the present embodiment, the current driver circuit 205(A) comprises a first control circuit 305 that operates in conjunction with a second control circuit 306 to apply one or more voltages to a gate terminal of one or more transistors, such as transistors 310, 325, 330 and 315. The current driver circuit 205(A) may further comprise a sense resistor 320 connected to transistors 315 and 325 and to the second control circuit 306. The second control circuit 306 utilizes the sense resistor 320 to detect and/or measure the magnitude of the drive current $I_{DR}$. The present embodiment may be described according to the following equations: (1) $V_{DD}=I_{DR}*(Rcoil+Rp+Rn+Rsense)$; (2) $Rp+Rn+Rsense=V_{DD}/I_{DR}-Rcoil$; and (3) $Q_1=I_{DR}^2*(Rp+Rn+Rsense)=I_{DR}^2*(V_{DD}/I_{DR}-Rcoil)=V_{DD}*I_{DR}-I_{DR}^2*Rcoil$, where $V_{DD}$ is a supply voltage, $Q_1$ is a total quantity of heat generated by the current driver circuit 205(A) (also referred to generally as the total quantity of heat Q), Rcoil is a resistance of the actuator, Rp is the resistance of transistor 310, Rn is the resistance of the transistor 315, and Rsense is the resistance of the sense resistor 320.

Figure 4:
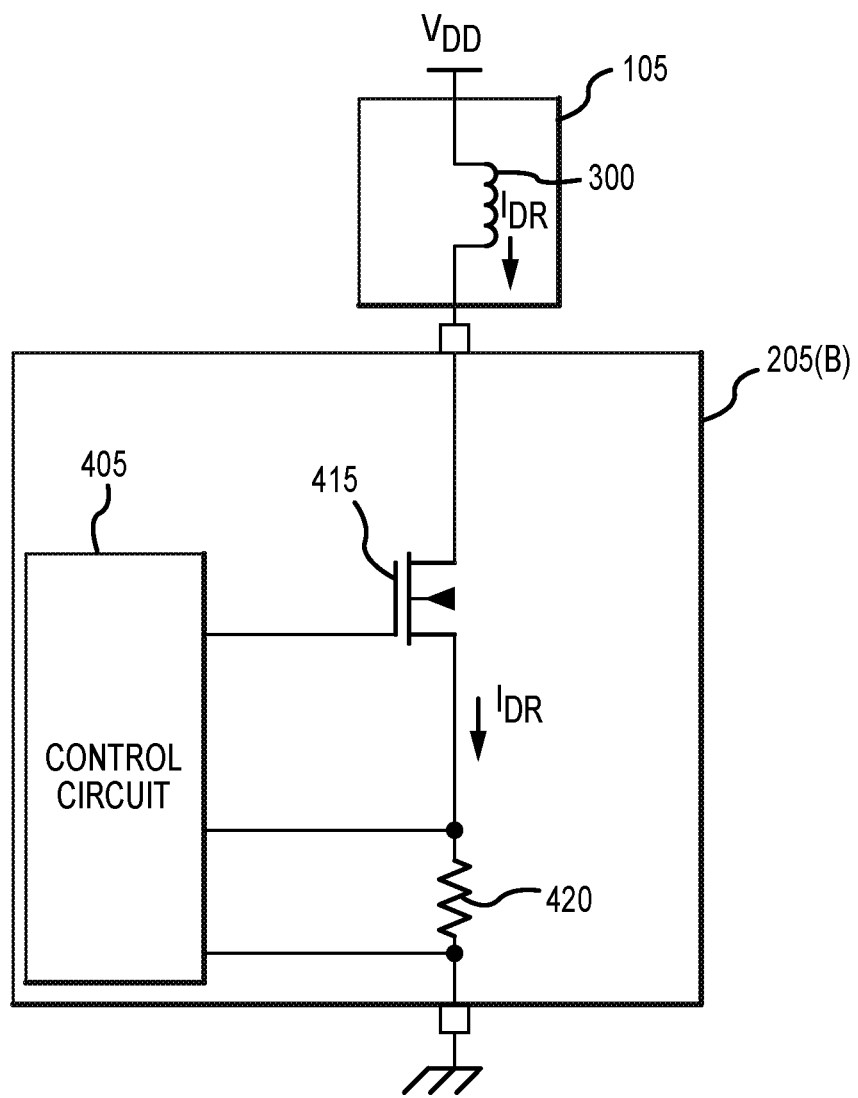
FIG. 4 is an alternative circuit diagram of a current driver in accordance with an exemplary embodiment of the present technology.

In an alternative embodiment, and referring to FIG. 4, the current driver circuit 205(B) may be configured as a unidirectional type that applies the drive current $I_{DR}$ in one direction. In the present embodiment, the current driver circuit 205(B) comprises a control circuit 405 that applies a voltage to a gate terminal of transistor 415. The current driver circuit 205(B) may further comprise a sense resistor 420 connected to transistor 415 and to the control circuit 405. The control circuit 405 utilizes the sense resistor 420 to detect and/or measure the magnitude of the drive current $I_{DR}$. The present embodiment may be described according to the following equations: (1) $V_{DD}=I_{DR}*(Rcoil+Rn+Rsense)$; (2) $Rn+Rsense=V_{DD}/I_{DR}-Rcoil$; and (3) $Q_2=I_{DR}^2*(Rn+Rsense)=I_{DR}^2*(V_{DD}/I_{DR}-Rcoil)=V_{DD}*I_{DR}-I_{DR}^2*Rcoil$, where $V_{DD}$ is a supply voltage, $Q_2$ is a total quantity of heat generated by the current driver circuit 205(B) (also referred to generally as the total quantity of heat Q), Rcoil is a resistance of the actuator, Rn is the resistance of the transistor 415, and Rsense is the resistance of the sense resistor 420.

Referring to FIG. 2, the temperature sensor 215 may be suitably configured to measure and report a temperature $T_S$ of the driver module 125. The temperature sensor 215 may comprise any suitable device for monitoring and reporting temperature, such as a thermistor. The temperature sensor 215 may be configured to transmit a signal, corresponding to the measured temperature $T_S$ of the driver module 125, to the adder circuit 240.

According to an exemplary embodiment, the temperature sensor 215 and the current driver 205(A/B) may be formed on the same chip (e.g., the driver module 125 chip). In such an arrangement, the measured temperature $T_S$ represents the air temperature around the driver module 125 as well as any self-generated heat of the current driver 205(A/B).

In alternative embodiments, the temperature sensor 215 may be formed on a companion chip.

The adder circuit 240 may be configured to add or subtract one or more input values. For example, the adder circuit 240 may be connected to an inverter (not shown) to perform subtraction. The adder circuit 240 may comprise any device and/or system suitable for performing addition or subtraction. In an exemplary embodiment, the adder circuit 240 is connected to the temperature sensor 215 and configured to receive the temperature $T_s$. The adder circuit 240 is further connected to the computation circuit 210 and configured to receive the total temperature change $\Delta T$ from the computation circuit 210 and compute a corrected temperature T according to the equation: $T=T_S-\Delta T$. The total temperature change $\Delta T$ value may be inverted prior to being added to the temperature $T_s$, thus resulting in a subtraction function. The corrected temperature T represents an ambient air temperature $T_{AMB}$ of the driver module 125.

The driver module 125 may further comprise a third register 220 (a temperature register 220). The temperature register 220 may be configured to store relevant temperature data, such as the corrected temperature T. For example, the temperature register 220 may be connected to an output terminal of the adder circuit 240 and configured to store one or more values of the corrected temperature T. For example, the temperature register 220 may store multiple consecutively-computed corrected temperatures T. The temperature register 220 may be further configured to communicate the corrected temperature T (or multiple corrected temperatures) to other devices within the imaging system 100, such as the signal processor 135 and the ISP 120. The temperature register 220 may comprise any suitable memory or storage device capable of storing data.

In operation, the imaging system 100 utilizes various equations to model or otherwise predict the thermal response the driver module 125 and the PCB 500. During operation, and referring to FIGS. 2 and 5, the driver module 125 generates the total quantity of heat Q due to the drive current $I_{DR}$. Some of this heat is dissipated into the air around the driver module 125, illustrated as $Q_A$, and some of the heat is dissipated into the PCB 500, illustrated as $Q_{BC}$. Accordingly, the temperature $T_S$ measured by the temperature sensor 215 includes both the ambient air temperature $T_{AMB}$ and the self-generated heat due to the drive current $I_{DR}$ generated by the current driver 205(A/B). In some applications, it is desirable to measure only the ambient air temperature $T_{AMB}$. However, the total temperature change $\Delta T$ of the driver module 125 is not a linear function of the drive current $I_{DR}$ so it can be difficult to determine or estimate the ambient air temperature $T_{AMB}$ based on the drive current $I_{DR}$ alone. The present technology utilizes predictive modeling to determine the total temperature change $\Delta T$ based on various specifications and thermal properties of the driver module 125 and the PCB 500.

Figure 7:
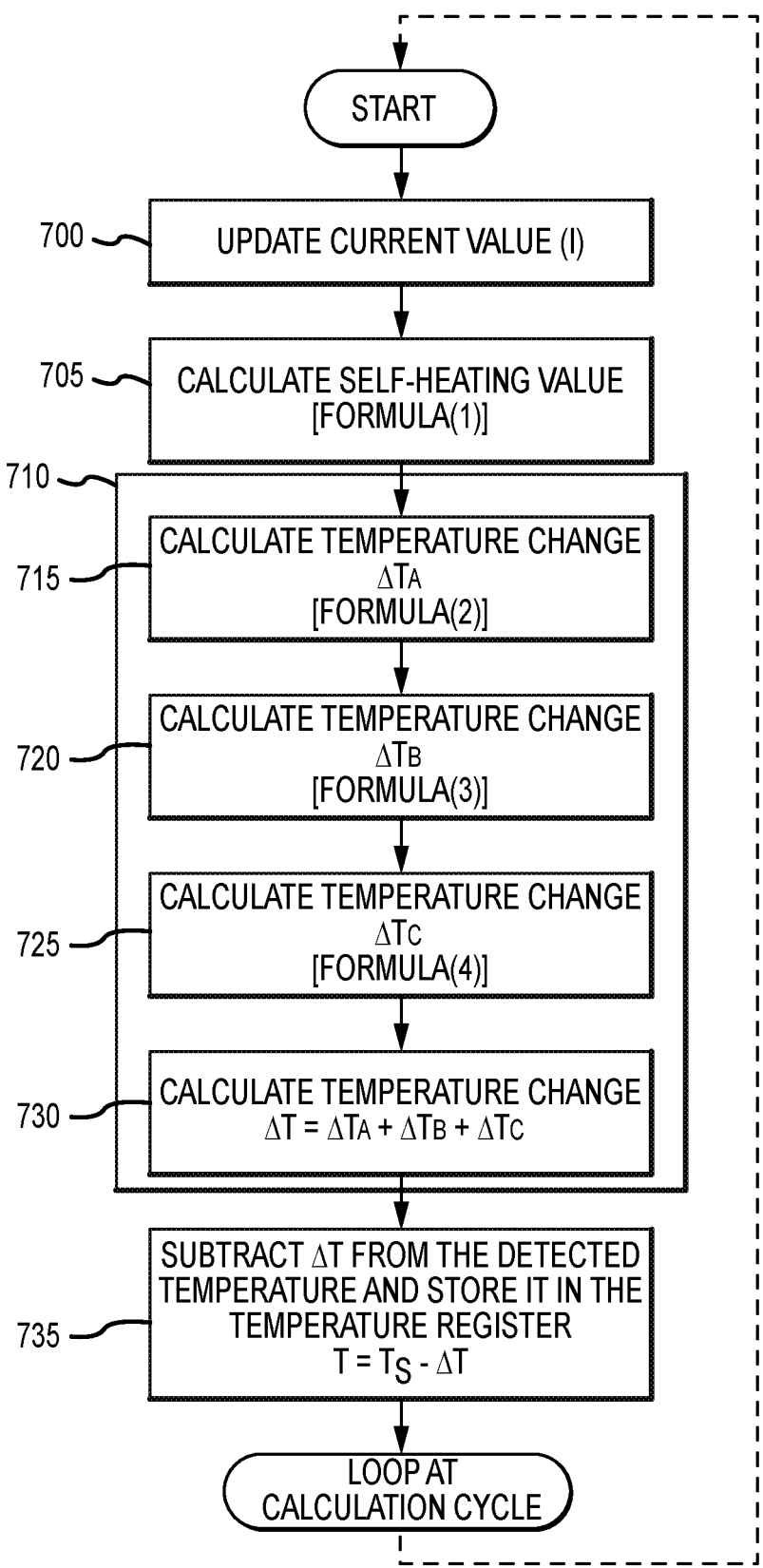
FIG. 7 is a flowchart for estimating an ambient temperature in accordance with an exemplary embodiment of the present technology.
Figure 8:
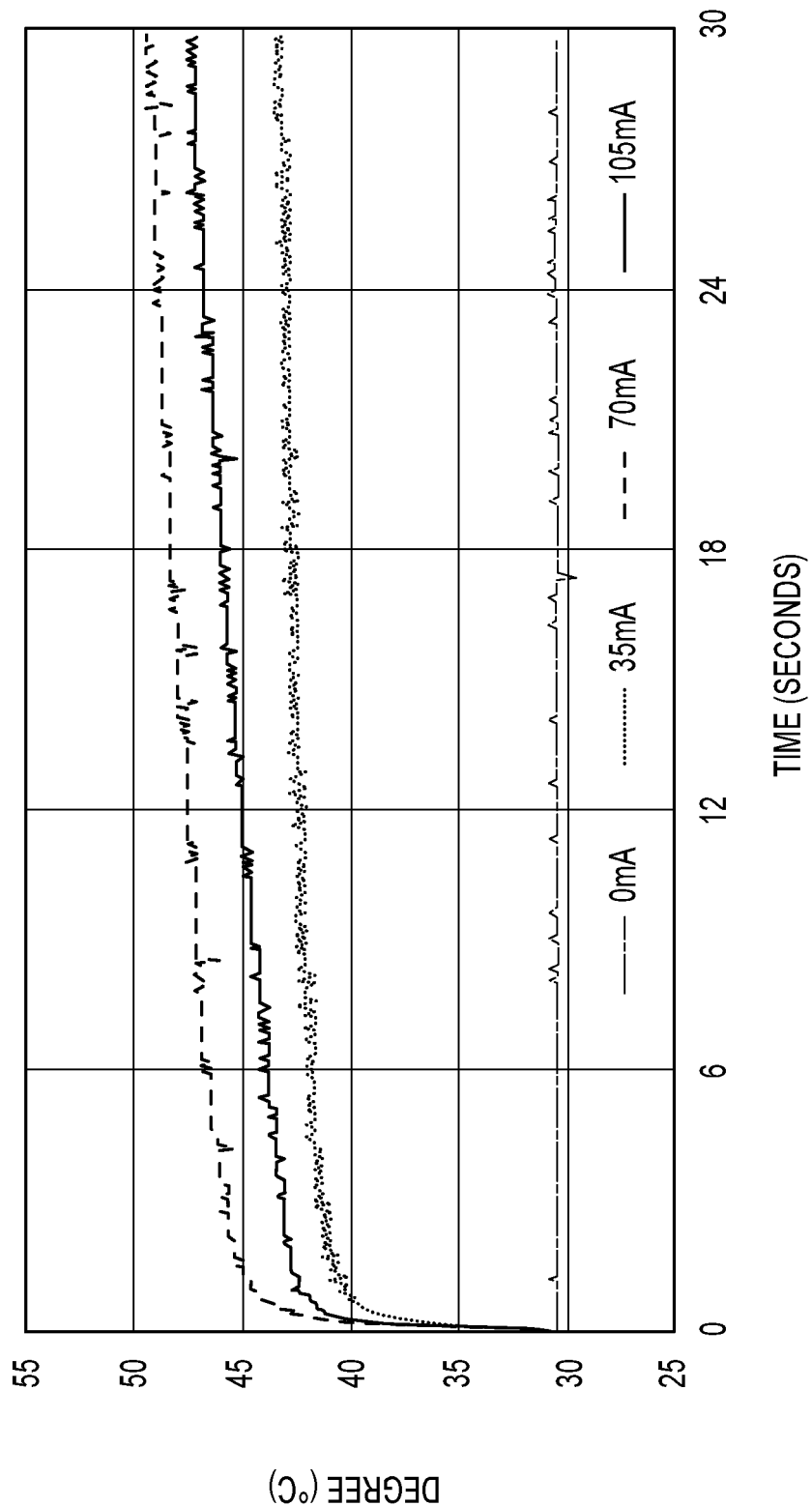
FIG. 8 is a graph of actual measured temperatures of the driver module over time according to an exemplary embodiment of the present technology.
Figure 9A:
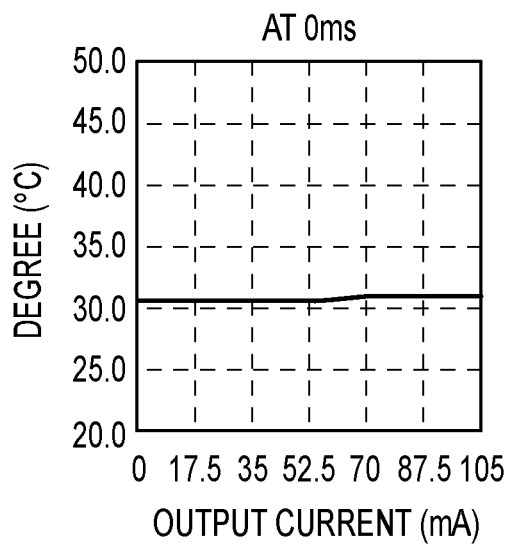
FIGS. 9A-9D are graphs of actual measured temperatures of the driver module versus various current values at various times in accordance with an exemplary embodiment of the present technology.
Figure 9B:
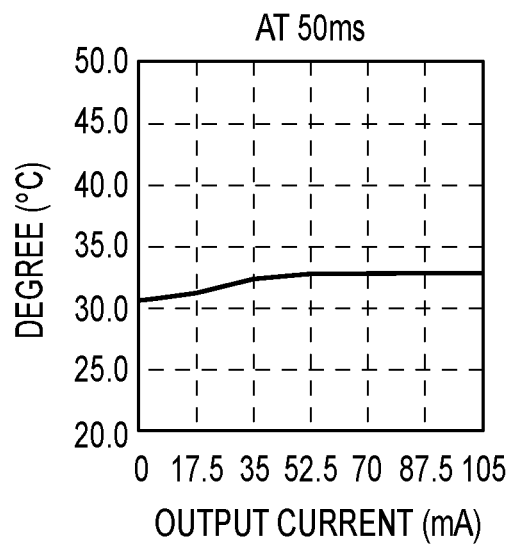
Figure 9C:
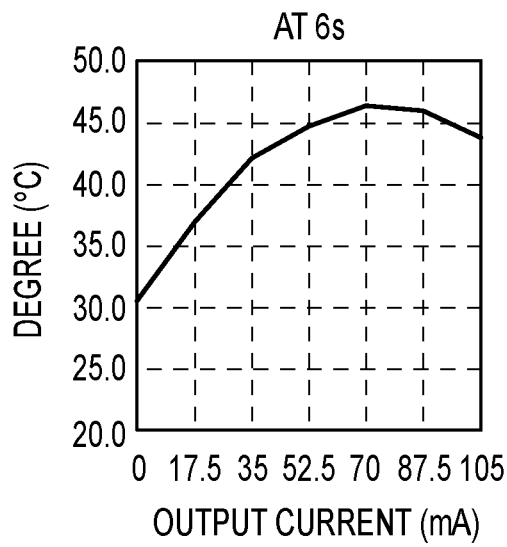
Figure 9D:
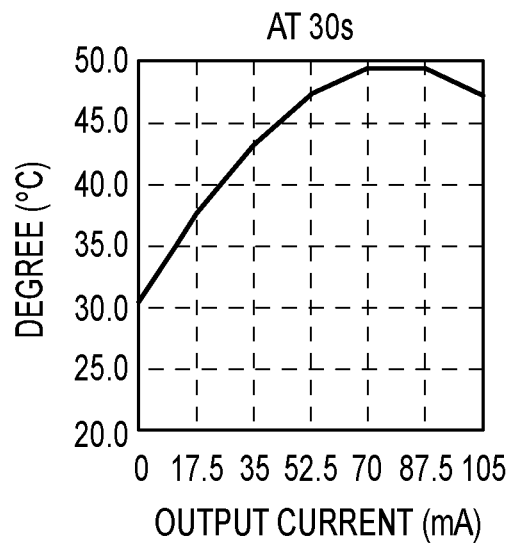
Figure 10:
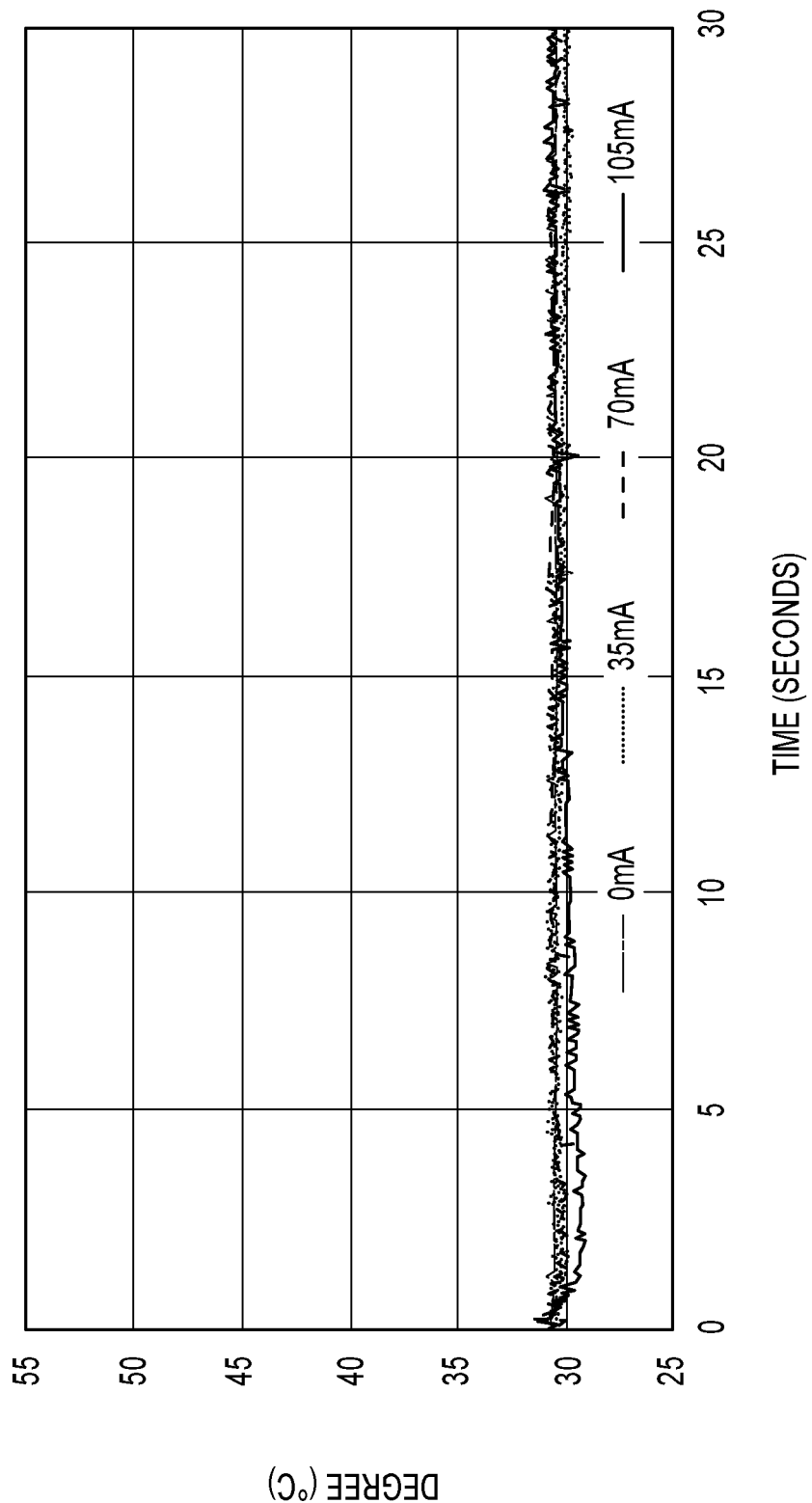
FIG. 10 is a graph of predicted temperatures of the driver module over time in accordance with an exemplary embodiment of the present technology.
Figure 11A:
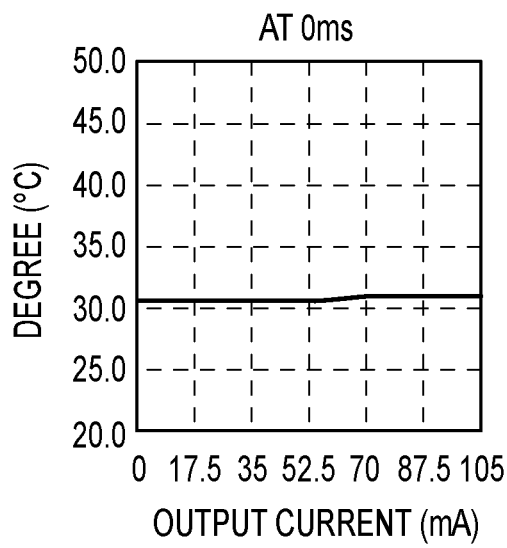
FIGS. 11A-11D are graphs of predicted temperatures of the driver module versus various current values at various times in accordance with an exemplary embodiment of the present technology.
Figure 11B:
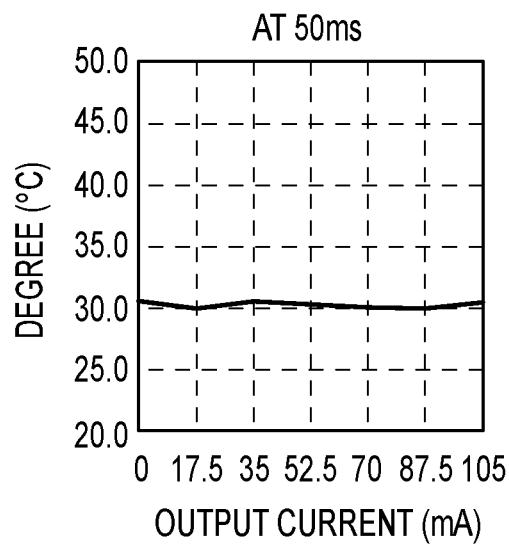
Figure 11C:
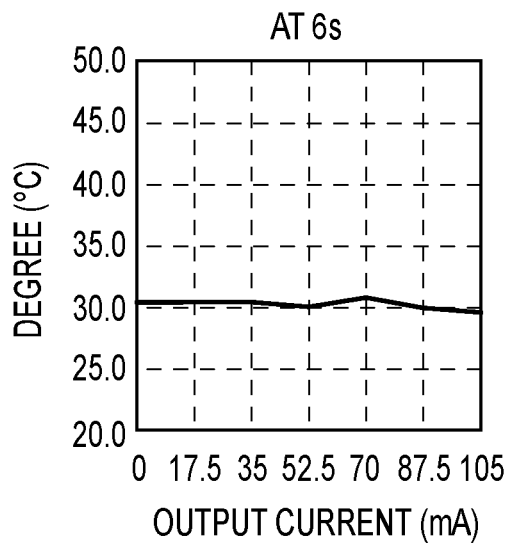
Figure 11D:
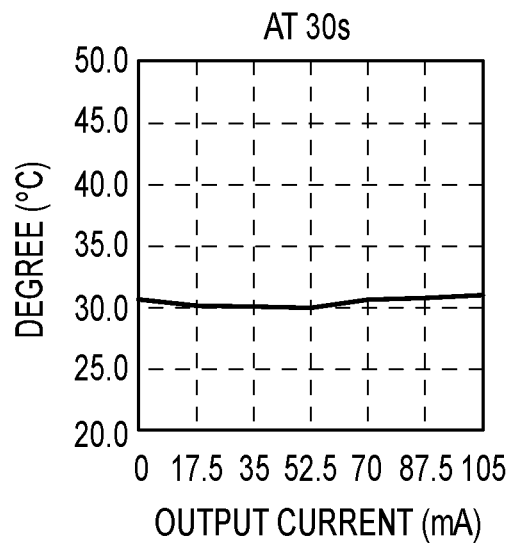

In an exemplary operation, and referring to FIGS. 1, 2, and 7, the driver module 125 may be configured to receive or update the drive current $I_{DR}$ value (700). For example, the current register 200 may communicate with another component, such as the signal processor 135, to receive the most recent drive current $I_{DR}$ information. The driver module 125 may then calculate the total quantity of heat Q (the self-generated heat) of the driver module 125 (705). For example, the first logic circuit 230 may calculate the total quantity of heat Q according to Formula 1 described above. The driver module 125 may then model or otherwise predict the temperature change $\Delta T$ according to the total quantity of heat Q (710).

In an exemplary embodiment, modeling or predicting the temperature change $\Delta T$ comprises: calculating the first temperature change $\Delta T_A$ according to Formula 2 above (715), calculating the second temperature change $\Delta T_B$ according to Formula 3 above (720), calculating the third temperature change $\Delta T_C$ according to Formula 4 above (725), and then calculating the total temperature change $\Delta T$ according to Formula 5 above (730).

The driver module 125 may then compute the corrected temperature T, which represents an estimate of the ambient air temperature $T_{AMB}$, according to the total temperature change $\Delta T$ and the measured temperature $T_s$. For example, the adder circuit 240 may receive the total temperature change $\Delta T$ and the measured temperature T as inputs and subtract the total temperature change $\Delta T$ from the measured temperature (735). The result is the corrected temperature T, which represents the ambient air temperature $T_{AMB}$. The adder circuit 240 may then transmit the computed corrected temperature T to the temperature register 220 (735).

Referring to FIGS. 2 and 8-11, in operation, as the measured temperature $T_s$, as measured by the temperature sensor 215 (FIGS. 8 and 9A-9D), of the driver module 125 increases, the corrected temperature T values (FIGS. 10 and 11A-11D) remain substantially constant over time. The corrected temperature T values also remain substantially constant at various drive current $I_{DR}$ values. In a case where the ambient temperature $T_{AMB}$ isn't changing, the results illustrated in FIGS. 10 and 11A-11D are expected since the influence of the self-generated heat on the measured temperature $T_S$ has been effectively removed or otherwise nullified.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A driver module, capable of operating an actuator, comprising:
  a current driver circuit;
  a temperature sensor adjacent to the current driver circuit and configured to:
    measure a temperature of the driver module; and
    generate measured temperature data; and
  a computation circuit configured to:
    obtain a current value of the current driver circuit;
    receive the measured temperature data from the temperature sensor;
    compute a self-heating value of the driver module according to the current value and a resistance value of the actuator;
    predict a total temperature change value of the driver module according to;
      the self-heating value, a first thermal resistance value for heat dissipated from the driver module into ambient air, a second thermal resistance value for heat dissipated from the driver module into a printed circuit board, and a third thermal resistance value for heat dissipated from the printed circuit board into the ambient air; and
    compute a corrected temperature value according to the predicted total temperature change value and the measured temperature;
  wherein the computed corrected temperature value represents an ambient air temperature of the driver module; and
  wherein the driver module is one of a plurality of electronic devices of a system, and the driver module is configured to communicate the corrected temperature value to another electronic device of the plurality of electronic devices.

2. The driver module according to claim 1, wherein predicting the total temperature change value comprises computing:
  a first temperature change value of the driver module according to the self-heating value and the first thermal resistance value;
  a second temperature change value of the driver module according to the self-heating value and the second thermal resistance value; and
  a third temperature change of the driver module according to the self-heating value and the third thermal resistance value.

3. The driver module according to claim 2, wherein:
  computing the first temperature change value is further based on a first thermal capacitance value;
  computing the second temperature change value is further based on a second thermal capacitance value; and
  computing the third temperature change value is further based on a third thermal capacitance value.

4. The driver module according to claim 2, wherein:
  computing the first temperature change value is further based on a first quantity of heat;
  computing the second temperature change value is further based on a second quantity of heat; and
  computing the third temperature change is further based on the second quantity of heat.

5. The driver module according to claim 2, wherein:
  predicting the total temperature change value further comprises adding the first, second, and third temperature change values together; and
  computing the corrected temperature value comprises subtracting the predicted total temperature change value from the measured temperature.

6. The driver module according to claim 1, further comprising:
  a first register connected to the computation circuit and configured to store the current value;
  a second register connected to the computation circuit and configured to store the resistance value of the actuator; and
  a third register connected to the computation circuit and configured to store the computed corrected temperature value.

7. The driver module according to claim 1, wherein:
  the driver module has a first surface area and is bonded to a printed circuit board (PCB); and
  the PCB has a second surface area that is larger than the first surface area.

8. A method for determining an ambient air temperature of a driver module connected to an actuator, comprising:
  obtaining a current of the driver module;
  measuring an actual temperature of the driver module;
  computing a self-heating value of the driver module according to the obtained current and a resistance of the actuator;
  predicting a total temperature change value of the driver module according to the self-heating value, a first thermal resistance value for heat dissipated from the driver module into ambient air, a second thermal resistance value for heat dissipated from the driver module into a printed circuit board, and a third thermal resistance value for heat dissipated from the printed circuit board into the ambient air;

computing a corrected temperature value according to the predicted total temperature change value and the measured actual temperature; and communicating the corrected temperature value to an electronic device; and wherein the computed corrected temperature value represents the ambient air temperature of the driver module.

9. The method according to claim 8, wherein predicting the total temperature change value comprises computing:
   a first temperature change value of the driver module according to the self-heating value and the first thermal resistance value;
   a second temperature change value of the driver module according to the self-heating value and the second thermal resistance value; and
   a third temperature change value of the driver module according to the self-heating value and the third thermal resistance value.

10. The method according to claim 9, wherein:
    computing the first temperature change value is further based on a first thermal capacitance value;
    computing the second temperature change value is further based on a second thermal capacitance value; and
    computing the third temperature change value is further based on a third thermal capacitance value.

11. The method according to claim 9, wherein:
    computing the first temperature change value is further based on a first quantity of heat;
    computing the second temperature change value is further based on a second quantity of heat; and
    computing the third temperature change value is further based on the second quantity of heat.

12. The method according to claim 9, wherein predicting the total temperature change value further comprises adding the first, second, and third temperature change values together.

13. The method according to claim 8, wherein computing the corrected temperature value comprises subtracting the predicted total temperature change value from the measured actual temperature.

14. A system, comprising:
    an actuator; and
    a plurality of electronic devices including a driver module, connected to the actuator, and bonded to a printed circuit board (PCB), wherein the driver module comprises:
       a current driver circuit configured to supply a current to the actuator;
       a temperature sensor positioned adjacent to the current driver circuit and configured to:
          measure a temperature of the driver module; and
          generate measured temperature data;
       a computation circuit configured to:
          obtain a current value of the current driver circuit;
          receive the measured temperature data from the temperature sensor;
          compute a self-heating value of the driver module according to the current value and a resistance value of the actuator;
          predict a total temperature change value of the driver module according to the self-heating value, a first thermal resistance value for heat dissipated from the driver module into ambient air, a second thermal resistance value for heat dissipated from the driver module into a printed circuit board, and a third thermal resistance value for heat dissipated from the printed circuit board into the ambient air; and
          compute a corrected temperature value according to the predicted total temperature change value and the measured temperature;
       wherein the computed corrected temperature value represents an ambient air temperature of the driver module; and
       wherein the driver module is configured to communicate the corrected temperature value to another electronic device of the plurality of electronic devices within the system.

15. The system according to claim 14, wherein predicting the total temperature change value comprises computing:
    a first temperature change value of the driver module according to the self-heating value, the first thermal resistance value, and a first thermal capacitance value;
    a second temperature change value of the driver module according to the self-heating value, the second thermal resistance value, and a second thermal capacitance value; and
    a third temperature change value of the driver module according to the self-heating value, the third thermal resistance value, and a third thermal capacitance value.

16. The system according to claim 15, wherein predicting the total temperature change value further comprises adding the first, second, and third temperature change values together.

17. The system according to claim 15, wherein:
    computing the first temperature change value is further based on a first quantity of heat;
    computing the second temperature change value is further based on a second quantity of heat; and
    computing the third temperature change value is further based on the second quantity of heat.

18. The system according to claim 17, wherein:
    the first quantity of heat comprises heat dissipated from the driver module and into a surrounding air; and
    the second quantity of heat comprises heat transferred from the driver module to the PCB.

19. The system according to claim 14, further comprising:
    a first register connected to the computation circuit and configured to store the current value; and
    a second register connected to the computation circuit and configured to store the resistance value of the actuator; and
    a third register connected to the computation circuit and configured to store the computed corrected temperature value.

20. The system according to claim 14, wherein computing the corrected temperature value comprises subtracting the predicted total temperature change value from the measured temperature.

* * * * *